(12) United States Patent
Becker

(10) Patent No.: US 8,297,178 B2
(45) Date of Patent: Oct. 30, 2012

(54) SERVOBRAKE

(75) Inventor: Stephan Becker, Badenheim (DE)

(73) Assignee: Continental Teves AG & Co. oHG (DE)

(*) Notice: Subject to any disclaimer, the term of this patent is extended or adjusted under 35 U.S.C. 154(b) by 927 days.

(21) Appl. No.: 12/377,193

(22) PCT Filed: Aug. 7, 2007

(86) PCT No.: PCT/EP2007/058200
§ 371 (c)(1),
(2), (4) Date: Feb. 11, 2009

(87) PCT Pub. No.: WO2008/019974
PCT Pub. Date: Feb. 21, 2008

(65) Prior Publication Data
US 2010/0192763 A1  Aug. 5, 2010

(30) Foreign Application Priority Data

Aug. 17, 2006 (DE) .......................... 10 2006 038 509
Nov. 10, 2006 (DE) .......................... 10 2006 053 142

(51) Int. Cl.
*F15B 13/16* (2006.01)
*F15B 9/09* (2006.01)

(52) U.S. Cl. .......................................................... 91/367
(58) Field of Classification Search ................... 91/367, 91/376 R
See application file for complete search history.

(56) References Cited

U.S. PATENT DOCUMENTS
2008/0245221 A1  10/2008  Kramer et al.

FOREIGN PATENT DOCUMENTS
WO   WO 02/087944 A1   11/2002
WO   WO 2006/005742 A1   1/2006

*Primary Examiner* — Daniel Lopez
(74) *Attorney, Agent, or Firm* — RatnerPrestia

(57) ABSTRACT

A servobrake for motor vehicles including a control valve which can be actuated by an electromagnet independently of an actuating rod which displaces a valve piston, which electromagnet actuates a third seal seat which makes possible ventilation of a working chamber. The third seal seat is formed on a sleeve which cooperates with the electromagnet, an annular element being provided which is arranged displaceably with respect to the third seal seat and which bears against the sleeve via an interposed elastic or compressible element. The annular element has means for guiding an air flow produced during normal braking in the direction of the working chamber.

6 Claims, 3 Drawing Sheets ated Aug. 17, 2006 and
SERVOBRAKE

CROSS REFERENCE TO RELATED APPLICATIONS

This application is the U.S. national phase application of PCT International Application No. PCT/EP2007/058200, filed Aug. 7, 2007, which claims priority to German Patent Application No. DE102006038509.8, filed Aug. 17, 2006 and German Patent Application No. DE102006053142.6, filed Nov. 10, 2006, the contents of such applications being incorporated by reference herein.

BACKGROUND OF THE INVENTION

1. Field of the Invention

The invention relates to a servobrake for motor vehicles.

2. Description of the Related Art

The invention relates to a servobrake for motor vehicles with a booster housing the interior of which is subdivided by a movable wall into a vacuum chamber and a working chamber, and with a control housing carrying the movable wall, in which control housing is arranged a control valve which controls a pneumatic pressure difference acting on the movable wall, can be actuated both by an actuating rod by means of a valve piston, and also, independently of the actuating rod, by an electromagnet, and consists of three seal seats arranged concentrically with respect to one another and of a valve body which cooperates with the seal seats and is provided with axial passages, the first seal seat being formed in the control housing and the second seal seat on the valve piston, while the third seal seat is formed on a sleeve cooperating with the electromagnet, there being provided an annular element which is arranged displaceably with respect to the third seal seat and which bears against the sleeve via an interposed elastic or compressible element, the edge region of which annular element oriented towards the valve body has partial areas separated from one another by radial openings via which it is in contact with the valve body, and which edge region in the release position is arranged axially offset towards the valve body with respect to the third seal seat, the annular element being arranged radially inside the sleeve in such a manner that its partial areas, by which it is in contact with the valve body, at least partially open the passages provided in the valve body.

A servobrake of this type is known from WO 2006/005742 A1. However, in the known servobrake noises which are experienced as disturbing occur in normal braking operation. This negative noise behavior is explained by the sudden reversal of the air flow against edges of the sleeve and by swirl of the incoming air flow against the second seal seat in the direction of the working chamber as a result of one-sided lifting of the second seal seat from the valve body, the swirl causing a vibrating air column to be produced in a chamber of the valve body. It is further regarded as negative that the swirl has a negative influence on the response-time and release-time dynamics of the servobrake.

SUMMARY OF THE INVENTION

It is an object of the present invention to provide an improved servobrake with respect to the noise behavior and flow conditions thereof.

This object is achieved in that the annular element has means for guiding an air flow produced during normal braking in the direction of the working chamber. The means permit specified guidance of the air flow so that the noise behavior and the flow conditions can be positively influenced.

The means preferably make possible guidance of the air flow along an inner side of the annular element. The air flow is thereby conducted in the direction of the working chamber in a specified manner and without detours or sudden reversals. In the most favorable case, an improvement in the response and release dynamics might thereby be achieved.

For concrete implementation of the inventive concept, an advantageous development of the invention provides that the annular element has on its end oriented towards the valve body a peripheral ring which ends flush with the partial areas in the axial direction, the ring covering a radial inner side of the passages in the radial direction. A flow brushing past the passages of the valve body, and therefore the production of a vibrating air column inside the valve body, can thereby be eliminated.

The ring is preferably connected integrally to the partial areas of the annular element, whereby additional assembly of the ring can be dispensed with.

Simple and low-cost production of the annular element is achieved in that the annular element is provided with the ring as a one-piece injection molding.

According to an advantageous development of the invention, for metered reduction of the pneumatic pressure built up in the booster housing of the pneumatic servobrake, and for stabilization, the areas of the annular element have a greater wall thickness, at least some of the partial areas being provided with recesses oriented towards the valve body. In the case of a controlled pressure-reduction phase, suction of atmosphere from the working chamber can thereby take place in a metered manner.

These and other aspects of the invention are illustrated in detail by way of the embodiments and are described with respect to the embodiments in the following, making reference to the Figures.

BRIEF DESCRIPTION OF THE DRAWINGS

In the following description the invention is explained in more detail with reference to an exemplary embodiment in conjunction with the appended drawing, in which.

DETAILED DESCRIPTION OF THE PREFERRED EMBODIMENTS

Figure 1:
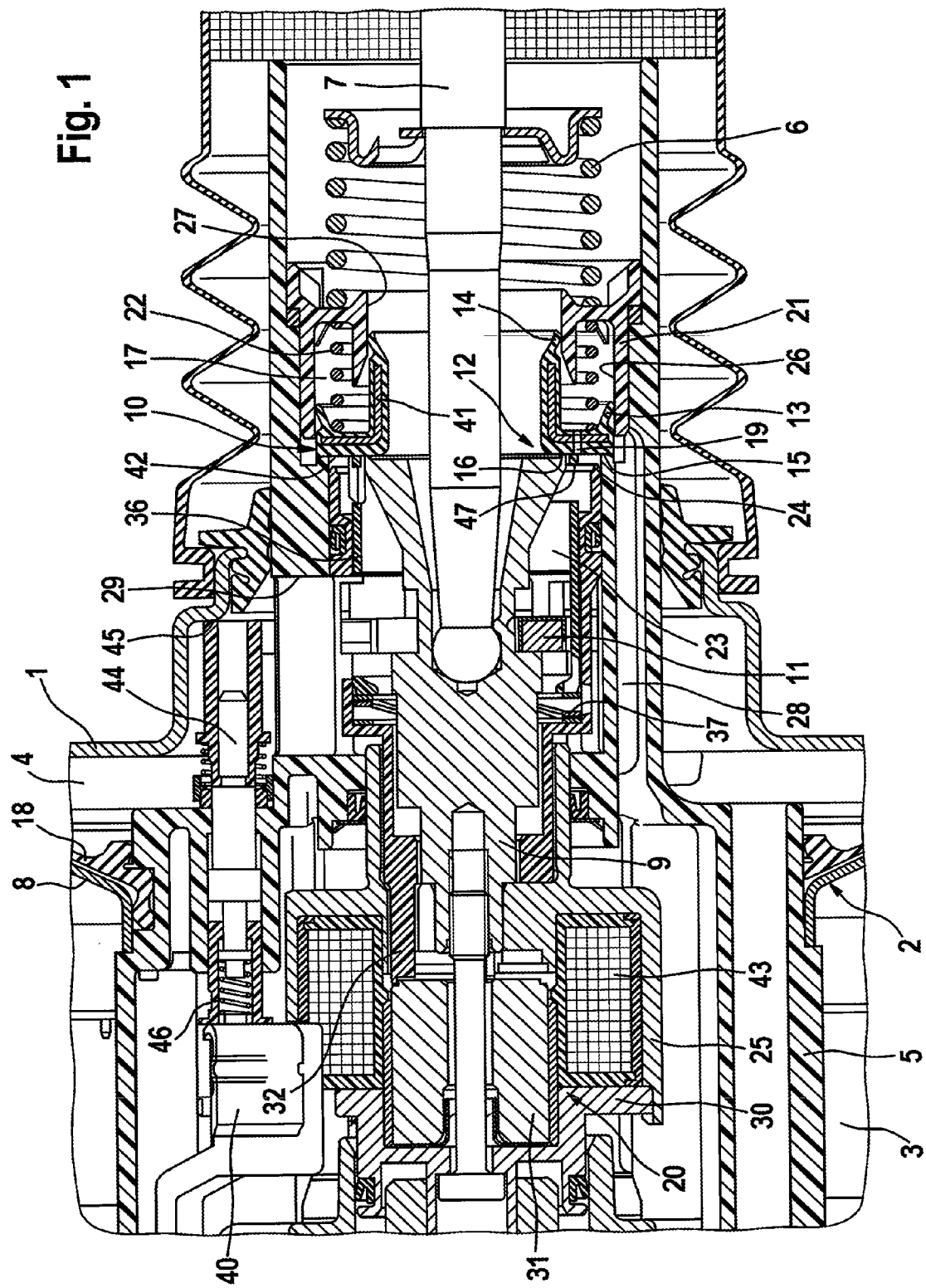
FIG. 1 shows the pneumatic control unit of an inventive servobrake in longitudinal section, partly cut-way, in the inactive readiness position.

The booster housing 1, indicated only schematically, of the servobrake according to aspects of the invention is subdivided by an axially movable wall 2 into a vacuum chamber 3 and a working chamber 4. The axially movable wall 2 consists of a deep-drawn sheet-metal diaphragm disk 8 and a flexible diaphragm 18 resting against same, which flexible diaphragm 18, not represented in detail, forms a rolling diaphragm as a seal between the outer periphery of the diaphragm disk 8 and the booster housing 1.

A control valve 12, which can be actuated by an actuating rod 7, is housed in a control housing 5 guided in a sealed manner in the booster housing 1 and supporting the movable wall 2, and consists of a first seal seat 15 formed on the control housing 5, a second seal seat 16 formed on a valve piston 9 connected to the actuating rod 7, and a valve body 10 cooperating with the two seal seats 15, 16 and guided in a guide part 21 arranged immovably in a sealed manner in the control housing 5, which valve body 10 has an L-shaped cross-section and is pressed against the valve seats 15, 16 by means of a valve spring 22 bearing against the guide part 21. The valve body 10 has two coaxially configured sealing lips 13, 14 of different axial lengths which cooperate with two coaxial cylindrical guide faces 26, 27 of the guide part 21. The guide part 21 delimits a pneumatic chamber 17 which can be subjected to the pneumatic pressure prevailing in the working chamber 4 via axial passages 19 formed in the valve body 10. The working chamber 4 is connectable to the vacuum chamber 3 via a lateral passage 28 disposed in the control housing 5.

A return spring (not shown in the drawing) which bears against the end face (also not shown) of the booster housing 1 on the vacuum side, holds the movable wall 2 in the starting position shown. In addition, a second compression spring or piston rod return spring 6 is provided, which bears at one end indirectly against the actuating rod 7 and at the other against the guide part 21, and the force of which ensures a preloading of the valve piston 9 or of its seal seat 16 with respect to the valve body 10.

Finally, in order to be able to connect the working chamber 4 to the atmosphere upon actuation of the control valve 12, an approximately radially disposed channel 29 is formed in the control housing 5. The return movement of the valve piston 9 at the end of a braking operation is limited by a transverse member 11 which, in the release position of the servobrake shown in the drawing, rests against a stop formed in the booster housing 1.

As is further apparent from the drawing, the valve body 10, which is stiffened by means of a metal stiffening profile 41, has an annular sealing face 42 cooperating with the two seal seats 15, 16 and provided with a plurality of axial passages 19. The flow channels (not indicated in detail) formed by the passages 19 and openings in the sealing face 42 connect the pneumatic chamber 17 with an annular chamber delimited by the seal seats 15, 16 which is connected to the above-mentioned pneumatic channel 29, so that the pneumatic chamber 17 formed on the side of the valve body 10 oriented away from the sealing face 42 is constantly connected to the working chamber 4, and so that an equalization of pneumatic pressure on the valve body 10 takes place.

The arrangement described therefore makes possible a reduction in the difference between the response force of the servobrake and the restoring force acting on the valve piston, in the sense that, with a constant response force an increase in the restoring force is possible, or with a constant restoring force a reduction in the response force is possible, whereby an improvement of the hysteresis of the inventive servobrake is achieved.

In order to induce an external actuation of the inventive servobrake independent of the actuating rod 7, a third seal seat 24 is provided radially between the first seal seat 15 and the second seal seat 16, which third seal seat 24 can be actuated by means of an electromagnet 20, which is preferably arranged in a housing 25 rigidly connected to the valve piston 9 and therefore is displaceable together with the valve piston 9 in the control housing 5. The electromagnet 20 consists of a coil 43 arranged inside the housing 25 and a cylindrical rotor 31 which is arranged axially displaceably and is partially guided in a closure part 30 which closes the housing 25 and supports a sleeve 32, in the region of which sleeve 32 oriented away from the valve body 10 the previously mentioned third seal seat 24 is formed. In the starting position of the rotor 31 represented in the drawing, the third seal seat 24 is arranged offset axially with respect to the second seal seat 16 formed on the valve piston 9, so that a gap is present between the third seal seat 24 and the sealing face 42 of the valve body 10. In addition, there is provided an annular element 36, preferably guided radially inside the sleeve 32, which is represented, in particular, in FIGS. 2 and 3 and which bears against the sleeve 32 via an interposed elastic or compressible element 37 in such a manner that relative movement is possible between it and the sleeve 32. In the example illustrated, the elastic or compressible element 37 is formed by an ondular washer and makes possible controllable activation of the annular element 36. A partial area of the annular element 36 oriented towards the valve body 10 is subdivided into partial areas 33 by radial openings 38.

Figure 2:
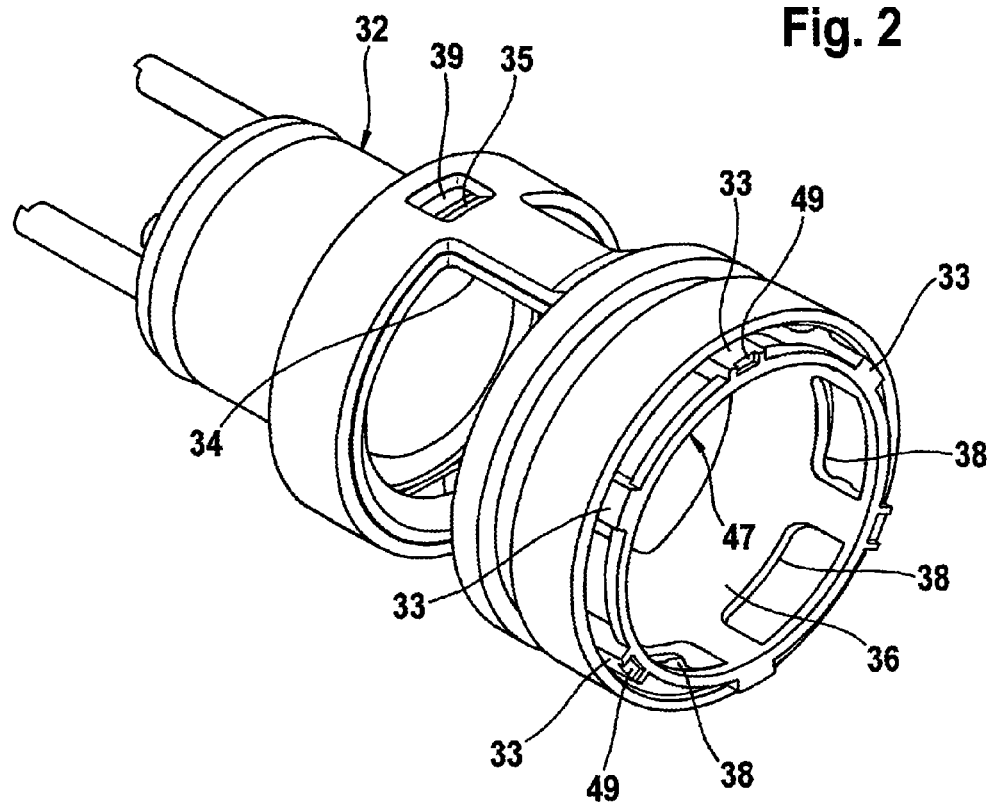
FIG. 2 is a perspective representation of a subassembly which forms a component of the pneumatic control valve of the inventive servobrake.
Figure 3:
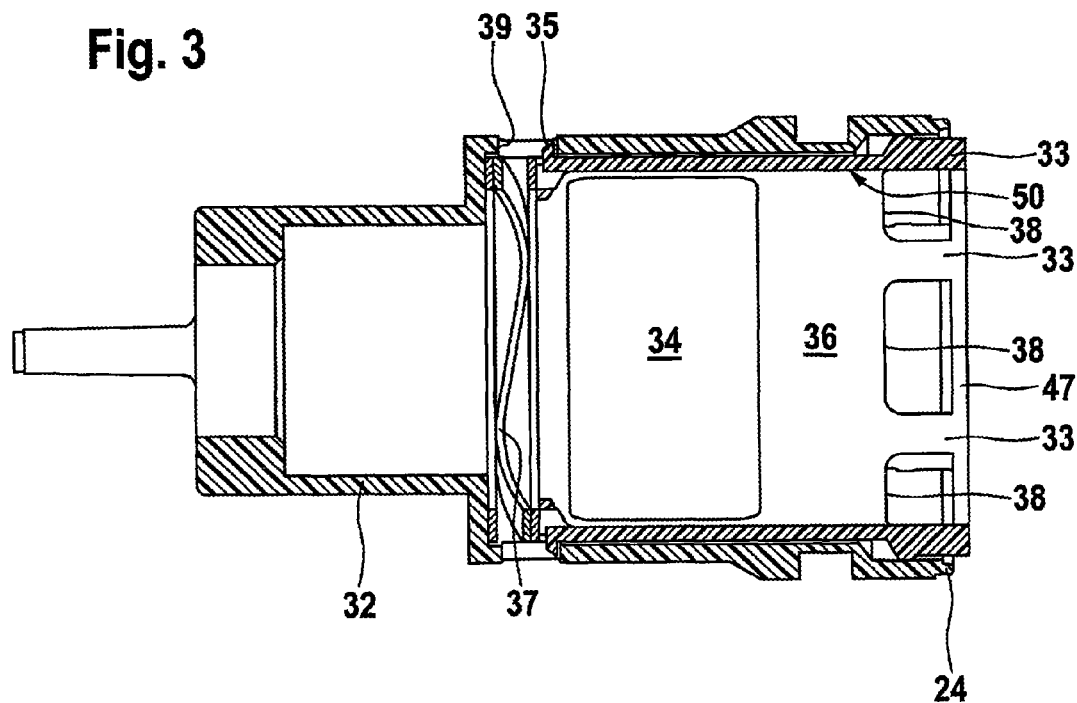
FIG. 3 shows the subassembly according to FIG. 2 in an axial sectional representation.

In order to be able to connect the pneumatic chamber 23 delimited by the sleeve 32 and the annular element 36 in the control housing 5 to the working chamber 4, an opening 34, which can be seen in FIGS. 2 and 3, is provided in both the parts mentioned. The arrangement of the aforementioned ondular washer 37 in the installed state is preferably implemented in such a manner that, viewed in the direction of actuation of the control valve 12, it is located behind the opening 34 and the aforementioned transverse member 11. The ondular washer 37 is thereby arranged outside the direct air-flow region, whereby positive effects on the flow cross sections with respect to the dynamics and the noise behavior of the servobrake are achieved. In addition, the annular element 36 has, in its region oriented towards the ondular washer 37, latching elements or projections 35 which cooperate with openings 39 formed in the sleeve 32 in such a manner that the annular element 36 forms a detachable subassembly with the sleeve 32.

As can be seen from FIGS. 2 and 3, the annular element 36 has on its end oriented towards the valve body 10 in the region of the partial areas 33 a peripheral ring 47 which is provided integrally with the annular element 36 and is configured flush with the partial areas 33 in the direction of the valve body 10. Furthermore, the peripheral ring 47 has the same internal diameter as the annular element 36 in the region of the partial areas 33. Production of the annular element 36 with the molded-on peripheral ring 47 is effected, for example, in a simple and low-cost manner by injection molding. The radial arrangement of the ring 47 in relation to the valve body 10 is especially apparent from FIG. 5. It can be seen that the ring 47 is so arranged with respect to the passages 19 of the valve body 10 that the ring 47 covers the passages 19 on their radial inner side 48, but does not completely close the passages 19. Pressure equalization between the chamber 17 inside the valve body 10 and the chamber 23 is thereby ensured via the openings 38 of the annular element 36 and the opening 34 of the annular element 36 and of the sleeve 32. The function of the annular element 36 and of the sleeve 32, and the advantages of the peripheral ring 47, are described in detail below.

Finally, in the embodiment of the inventive servobrake shown in the drawing electrical switching means 40, 44 are provided which are important, in particular, during braking operations in which the electromagnet 20 is activated in addition to driver actuation in order to bring about full braking independently of driver wish (so-called brake assist function). In this case it is especially important that the switching means 40, 44 are actuated at each braking operation. At the same time it must be ensured that the electromagnet 20 is switched off reliably upon termination of the braking operation assisted by external force. The switching means illustrated consist of a microswitch 40 having two switching positions and fastened preferably to the valve piston 9 or the housing 25 of the electromagnet 20, and of an actuating element 44 which actuates the microswitch 40 by a translational movement, is guided in a sealed manner in a bore provided in the control housing 5 and cooperates with a stop 45 rigidly mounted on the booster housing, which bears the reference numeral 45 and may be formed, for example, by a radial collar of the rear half of the booster housing. A compression spring 46 is arranged between the actuating element 44 and the control housing 5, so that the end of the actuating element 44 oriented away from the microswitch 40 rests against the stop 45 under preload.

The individual actuation phases of the control valve 12 when being actuated externally by the electromagnet 20 are known in principle and will therefore be described only briefly.

In the rest or readiness position of the control valve 12 shown in FIG. 1, the valve body 10 rests both against the first seat seal 15 and against the second seat seal 16, so that the two chambers 3, 4 of the servobrake are separated from one another and the connection of the working chamber 4 to the atmosphere is interrupted. The third seal seat 24 is located at a distance from the sealing face 42 of the valve body 10, and the partial areas 33 and the peripheral ring 47 of the annular element rest against the sealing face 42.

In order to induce a pressure build-up position independently of the driver, the electromagnet 20 is energized so that both the third seal seat 24 and the annular element 36 first come into abutment against the valve body 10 while the elastic element 37 is simultaneously compressed, and then displace the valve body 10 towards the right in the drawing against the force of the valve spring 22, so that a gap is formed between the second seal 16 and the valve body 10 and ventilation of the working chamber 4 takes place. As this happens the first seal seat 15 is replaced in its function by the third seal seat 24.

In a pressure-maintaining phase the second seal seat 16 and the third seal seat 24 are closed, so that no changes can occur in the pneumatic pressure prevailing in the booster housing 1.

In a controlled pressure-reduction phase, the second seal seat 16 remains closed and the third seal seat 24 lifts from the sealing face 42 while the partial areas 33 and the peripheral ring 47 of the annular element 36 rest against the sealing face 42 through the preload of the elastic element 37, so that metered suction of atmosphere from the working chamber 4, and therefore a reduction of the pneumatic pressure induced in the booster housing 1 of the pneumatic servobrake takes place via recesses 49 of at least some of the partial areas 33, which can be seen, in particular, in FIG. 2.

Figure 4:
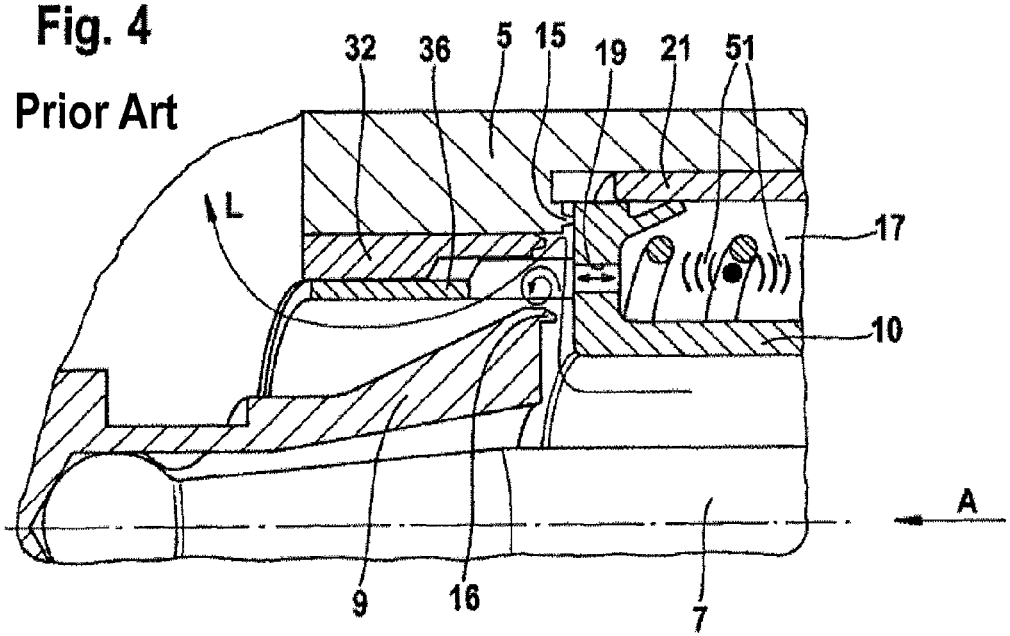
FIG. 4 shows an enlarged detail in the region of the disk valve of a known servobrake.
Figure 5:
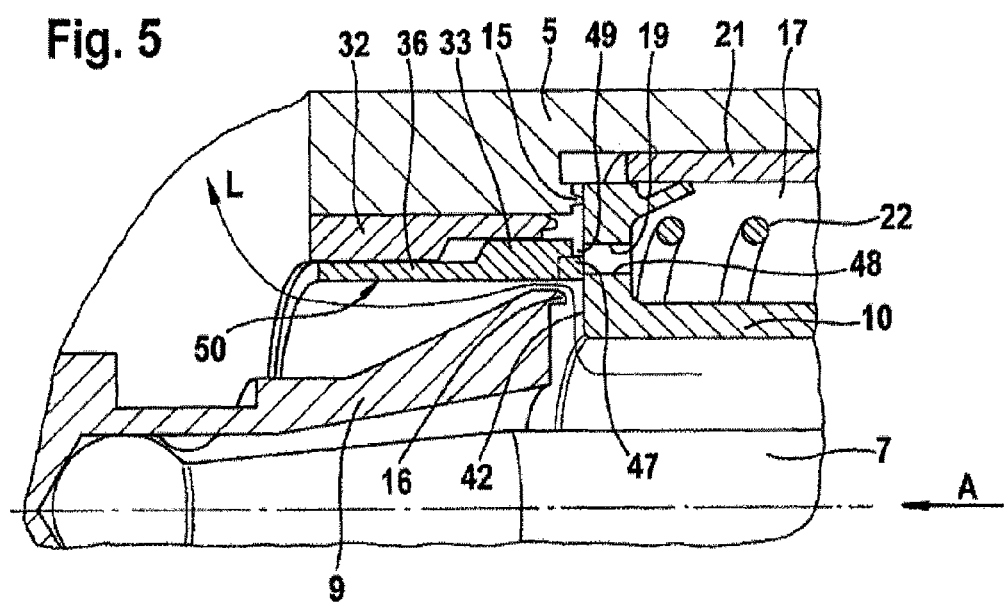
FIG. 5 shows an enlarged detail in the region of the disk valve of the inventive servobrake according to FIG. 1.

In both FIGS. 4 and 5 a normal braking operation is represented in which the valve piston 9 with the associated seal seat 16 is moved in the actuating direction A by the actuating rod 7 and the first seal seat 15, formed on the control housing 5, remains closed. Atmosphere can therefore flow into the working chamber 4 via the open second seal seat 16, so that a differential pressure is built up in the booster housing 1. The general operation a servobrake is sufficiently known, so that a description thereof is dispensed with.

FIG. 4 shows a partial view of a known servobrake according to WO 2006/005742 A1 in longitudinal section. As can be seen, as the second seal seat 16 opens an air flow passes across the passages 19 of the valve body 10, the air flow being indicated by the arrow L. As this happens, the air flow L passes over the passages 19 of the valve body 10, is swirled thereby and generates in the chamber 17 of the valve body 10 a vibrating air column 35 which generates disturbing noise, since the chamber 17 acts as a resonator. A further cause of disturbing noises in a normal brake position may be a sudden reversal of the air flow L against edges of the sleeve 32.

FIG. 5 shows an enlarged representation of the relevant portion of the inventive servobrake according to FIGS. 1 to 3. As is apparent from FIG. 5, the ring 47 of the annular element 36, resting against the sealing face 42, covers the radial inner side 48 of the passages 19. It is thereby ensured that the air flow L is guided along an inner side 50 of the annular element 30 in the direction of the working chamber 4, whereby the air flow L cannot flow past the passages 19 and noise-formation can be prevented.

A further advantage is improved guidance of the air flow L, whereby an improvement in the response time and release time of the servobrake can in some cases be made possible.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A servobrake for motor vehicles comprising:

a booster housing having an interior which is subdivided by a movable wall into a vacuum chamber and a working chamber, a control housing for carrying the movable wall, a control valve arranged in the control housing that is configured to control a pneumatic pressure difference acting on the movable wall and is configured to be actuated by an actuating rod and valve piston or by an electromagnet independently of the actuating rod, wherein the control valve comprises three seal seats arranged concentrically with respect to one another and a valve body which cooperates with the seal seats and includes axial passages, the first seal seat being formed in the control housing, the second seal seat being formed on the valve piston, and the third seal seat being formed on a sleeve cooperating with the electromagnet, and an annular element arranged displaceably with respect to the third seal seat and being positioned to bear against an elastic or a compressible element which in turn bears against the sleeve, the annular element having partial areas separated from one another by radial openings and a peripheral ring disposed to contact the valve body, wherein, in a release position, the peripheral ring of the annular element is arranged axially offset towards the valve body with respect to the third seal seat, the annular element being arranged radially inside the sleeve such that the partial areas are configured to at least partially open the passages provided in the valve body, wherein the peripheral ring guides an air flow produced during normal braking in the direction of the working chamber.

2. The servobrake as claimed in claim 1, wherein the peripheral ring is configured to guide the air flow along an inner side of the annular element.

3. The servobrake as claimed in claim 2, wherein the peripheral ring covers a radial inner side of the passages in a radial direction.

4. The servobrake as claimed in claim 3, wherein the peripheral ring is connected integrally to the partial areas of the annular element.

5. The servobrake as claimed in claim 4, wherein the annular element is provided with the ring as a one-piece injection molding.

6. The servobrake as claimed in claim 1, wherein segments of the partial areas of the annular element have an increased wall thickness relative to remaining parts of the partial areas, at least some of the partial areas being provided with recesses oriented towards the valve body.

* * * * *